(12) United States Patent
Nocon et al.

(10) Patent No.: US 11,032,166 B2
(45) Date of Patent: Jun. 8, 2021

(54) SECONDARY ROBOT COMMANDS IN ROBOT SWARMS

(71) Applicant: Disney Enterprises, Inc., Burbank, CA (US)

(72) Inventors: Nathan D. Nocon, Valencia, CA (US); Michael P. Goslin, Sherman Oaks, CA (US); Janice K. Rosenthal, Pasadena, CA (US); Corey D. Drake, Sunland, CA (US)

(73) Assignee: Disney Enterprises, Inc., Burbank, CA (US)

( * ) Notice: Subject to any disclaimer, the term of this patent is extended or adjusted under 35 U.S.C. 154(b) by 297 days.

(21) Appl. No.: 16/047,128

(22) Filed: Jul. 27, 2018

(65) Prior Publication Data
US 2020/0036609 A1 Jan. 30, 2020

(51) Int. Cl.
*H04W 84/18* (2009.01)
*H04L 12/26* (2006.01)
*B25J 9/00* (2006.01)
*B25J 13/00* (2006.01)
*H04N 7/18* (2006.01)

(52) U.S. Cl.
CPC .......... *H04L 43/028* (2013.01); *B25J 9/0084* (2013.01); *B25J 13/006* (2013.01); *H04N 7/18* (2013.01); *H04W 84/18* (2013.01)

(58) Field of Classification Search
CPC ..... H04L 43/028; B25J 9/0084; B25J 13/006; H04N 7/18; H04W 84/18
See application file for complete search history.

(56) References Cited

U.S. PATENT DOCUMENTS

| | | | | |
|---|---|---|---|---|
| 8,379,967 | B1* | 2/2013 | Bush | G05D 1/104 |
| | | | | 382/153 |
| 9,605,926 | B1* | 3/2017 | Means | G01S 19/14 |
| 2016/0037469 | A1* | 2/2016 | Smith | A63F 13/327 |
| | | | | 370/312 |
| 2017/0045884 | A1* | 2/2017 | Kablaoui | H04L 67/10 |
| 2017/0131727 | A1* | 5/2017 | Kurdi | G06Q 50/00 |
| 2018/0204382 | A1* | 7/2018 | Simpson | G09B 5/067 |
| 2018/0217593 | A1* | 8/2018 | Erickson | G08G 5/0086 |
| 2019/0236963 | A1* | 8/2019 | High | G05D 1/0027 |

OTHER PUBLICATIONS

Omar Shrit, Steven Martin, Khaldoun Al Agha, Guy Pujolle. A new approach to realize drone swarm using ad-hoc network. 2017 16th Annual Mediterranean Ad Hoc Networking Workshop (Med-Hoc-Net), Jun. 2017, Budva, Montenegro. 10.1109/MedHocNet.2017. 8001645. hal-01696735 (Year: 2017).*

* cited by examiner

*Primary Examiner* — Jeff A Burke
*Assistant Examiner* — Joshua Alexander Garza
(74) *Attorney, Agent, or Firm* — Patterson + Sheridan, LLP

(57) ABSTRACT

Systems, methods and articles of manufacture that handle secondary robot commands in robot swarms may operate by receiving, at a receiving device in a swarm of devices, a packet included in a signal broadcast within an environment from a transmitting device in the swarm of devices; parsing the packet for a command associated with a primary effect and a secondary effect; in response to determining that the receiving device is paired with the transmitting device, implementing, by the receiving device, the primary effect; and in response to determining that the receiving device is not paired with the transmitting device, implementing, by the receiving device, the secondary effect.

20 Claims, 10 Drawing Sheets

SECONDARY ROBOT COMMANDS IN ROBOT SWARMS

BACKGROUND

When several remote controlled devices are present within an environment, those devices may belong to an ad hoc swarm. Each device may be associated with a user, who remotely controls that device and can selectively add or remove the device from the swarm. For example, if users Alex, Blake, and Charlie are associated with a respective first, second, and third devices, when the three users issue commands to respective devices within a given area, a swarm consists of three devices. If a user removes a device from the swarm (e.g., Charlie goes home and takes the third device out of the interaction area) or a new user adds a new device to the swarm (e.g., Dakota enters the area with a fourth device), the swarm will grow or shrink in numbers accordingly. Each device in the swarm receives commands from the associated user, and may ignore commands from the other users. For example, a first device may be paired with a remote controller (in Alex's possession) to allow Alex to control that device. The pairing of the controllers with the devices preserves the ability of the swarm to grow or shrink as more devices come into range of one another, but may affect the interaction possibilities between the devices.

For the users of remote controlled devices in an ad hoc swarm to have those devices interact, the users may have the devices physically interact, or rely on imagination to substitute for actual interaction. For example, Alex may control the first device to bump into the second device or shine a beam of light at a target sensor of the second device—physically pushing the second device with the first device or physically triggering a response to the beam of light. In another example, Blake may pretend that the third device has interacted with the second device (e.g., "refueling" the second device, "issuing a challenge" to the second device, "casting a spell" on the second device)—acting on an imaginary interaction between two or more devices. Physical interactions between devices may damage one or more devices making contact, and imaginary interactions may result in conflicts between users who have differing opinions on what the effect of one user's imaginary action should be. For example, if Alex collides the first device into the second device with sufficient force, the first device or the second device may be broken or damaged. In another example, if Blake imagines that the second device has interacted with Charlie's device in a way that Blake and Charlie cannot agree on, an argument may result between Blake and Charlie.

SUMMARY

The present disclosure provides, in one embodiment, a method, comprising: receiving, at a receiving device in a swarm of devices, a packet included in a signal broadcast within an environment from a transmitting device in the swarm of devices; parsing the packet for a command associated with a primary effect and a secondary effect; in response to determining that the receiving device is paired with the transmitting device, implementing, by the receiving device, the primary effect; and in response to determining that the receiving device is not paired with the transmitting device, implementing, by the receiving device, the secondary effect.

The present disclosure provides, in another embodiment, a computer program product for handling secondary robot commands in robot swarms, the computer program product comprising: a computer-readable storage medium having computer-readable program code that when executed by a processor, enable the processor to: receive a packet at a receiving device; in response to determining that the receiving device is a primary recipient for the packet in a swarm of devices, implement a primary effect on the receiving device; and in response to determining that the receiving device is among at least one secondary recipient for the packet in the swarm of devices, implement a secondary effect on the receiving device.

The present disclosure provides, in a further embodiment, a system, comprising: a radio; a processor; a memory, including instructions that when executed by the processor, enable the system to: receive, via the radio, a packet; identify a transmitting device for the packet; in response to determining that the transmitting device is paired with the system, perform a primary effect of a command included in the packet; and in response to determining that the transmitting device is not paired with the system, perform a secondary effect of the command included in the packet.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Secondary robot commands for use in ad hoc swarms of robots are provided herein. In contrast to coordinated swarms, ad hoc swarms of robotic devices allow for the number of constituent robotic devices to change over time without a handshake or acknowledgment process between the devices or the controllers for those devices. For example, several users may gather robotic devices into an area for an interactive session, and the devices may be aware of what other robotic devices are in the area (as per a coordinated swarm) or unaware of what other robotic devices are in the area (as per an ad hoc swarm). The ad hoc swarm offers the benefit that users may freely add or remove the devices from the group without impact to the other devices in the group; no join handshake or leave handshake is required to alert the other devices of the swarm that a given device is joining/leaving the group.

Secondary robot commands enable the individual robotic devices in an ad hoc swarm to wirelessly interact with other robotic devices with fewer commands issued between the devices and associated controllers. Primary commands, as opposed to secondary commands, specify actions that an individual robot paired with the transmitting device is to perform, whereas secondary commands are the individually determined reactions of the other robots in the ad hoc swarm to the actions specified in primary command. In some embodiments, a primary command that is directed to a specified robot in the ad hoc swarm (e.g., from a paired controller) is interpreted by the other robots in the ad hoc swarm as a secondary command (e.g., to "react" to the action specified for the specified robot). In other embodiments, a primary command that is directed to a specified robot in the ad hoc swarm causes the specified robot to broadcast a second signal (in addition to any other actions specified in the primary command), that the other robots in the ad hoc swarm receive and act on as a secondary command to inform those other robots how to react to the actions of the specified robot.

Unless specified otherwise, when used to refer to a group or a plurality of devices, the term "swarm" shall be interpreted to refer to an ad hoc swarm.

Figure 1A:
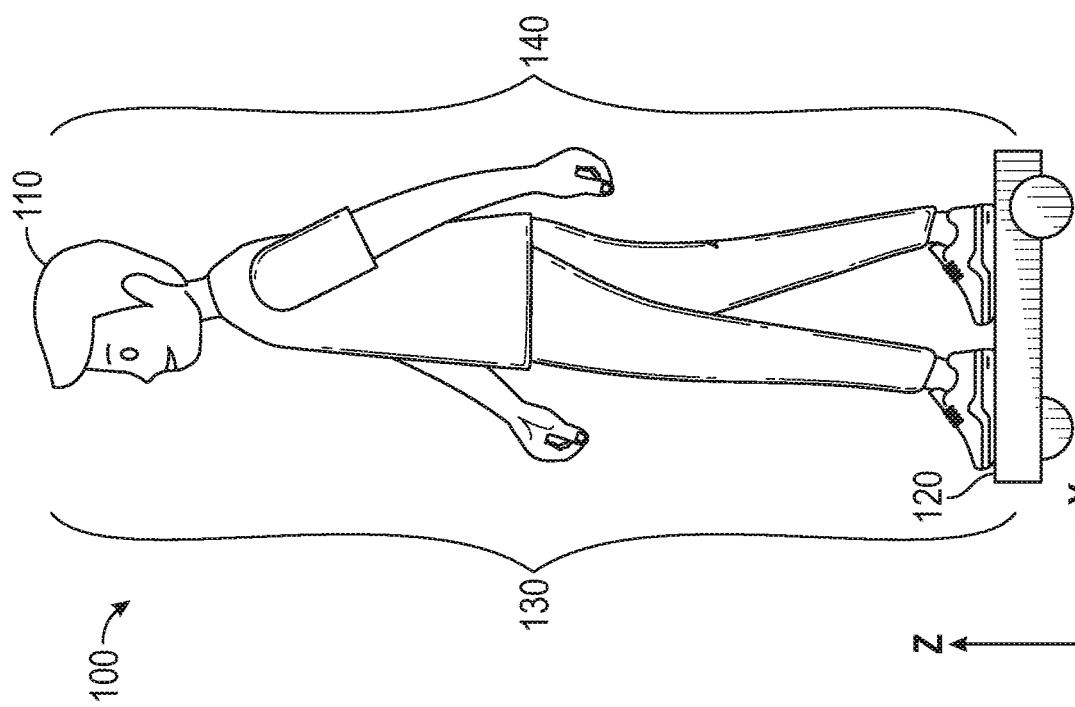
FIGS. 1A-C illustrate examples of remotely controlled devices according to aspects of the present disclosure.
Figure 1B:
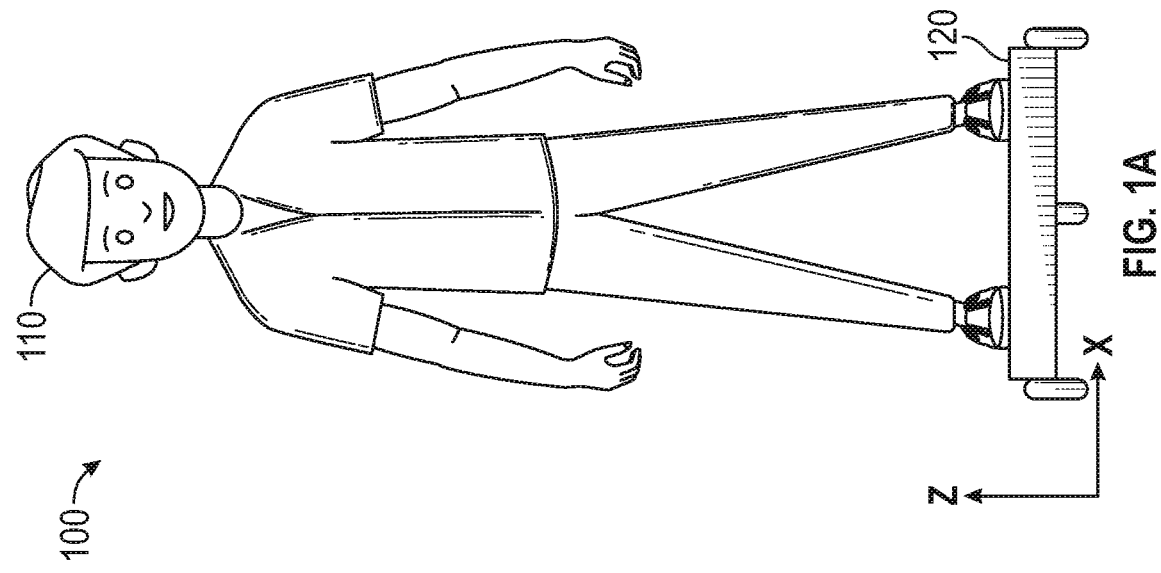

Referring now to FIGS. 1A and 1B, two views of an example remote controlled device of a robotic action figure are shown. A robotic action figure may generally or collectively be referred to herein as a bot 100, bots 100, or bots 100n. Specific examples of a bot 100 may be distinguished from one another by various titles and postscripts after the associated element number (e.g., first bot 100a, second bot 100b).

Each bot 100 described herein includes a top 110, a base 120, a front 130, and a back 140. These descriptors of the bot 100 are defined in reference to the given bot 100 being described, and may vary from bot 100 to bot 100. For example, a user may hold a given bot 100 upside-down, with the base 120 above the top 110 without altering which portion of the bot 100 is considered the top 110 or the base 120. In another example, a bot 100 may have a top 110 defined at a position other than illustrated highest position (in the Z axis) shown in FIGS. 1A and 1B, such as when the arms of the bot 100 are raised above the top 110.

The base 120 provides the bot 100 with locomotive force, such as through one or more drive wheels capable of imparting locomotion to the bot 100, with the remaining wheels being free wheels. Although the example bot 100 shown in FIGS. 1A and 1B is mounted on a base 120 with three wheels, in other embodiments, a base 120 may use more or fewer than three wheels and in different arrangements than illustrated. In some embodiments, the base 120 may include rolling surfaces other than wheels (e.g., balls, skids, tracks) and may incorporate casters or rack/pinion interfaces to steer the movement of the bot 100. In various embodiments, the base 120 may omit wheels entirely, such as when the bot 100 uses two sets of tracks, a serpentine crawl for locomotion, uses legs for locomotion, is configured for use in water (and uses a propeller, jet, sails, or swimming motion for locomotion), is configured for use in flight (and uses a lifting gas or lifting surface and propellers or jets for locomotion), etc.

The front 130 and the back 140 designate opposite sides of the bot 100. In some embodiments the front 130 may occupy more or less than 180 degrees of the perimeter of the bot 100 (and the back 140, correspondingly, may occupy less or more than 180 degrees), and the front 130 and the back 140 may be sub-divided into various regions (e.g., front-left, front-center, front-right) around the perimeter of the bot 100. In some embodiments, the front 130 and the back 140 of the bot 100 may be defined relative to the head of the bot 100. In various embodiments, the bot 100 is defined to have a face (e.g., with eyes, nose mouth, etc.) to represent a well-known character, animal, or archetype from a movie, television show, play, story, or real-life. Although the illustrated bot 100 is humanoid in appearance, other body forms are contemplated (robots, horses, elephants, dragons, cars, aircraft, ships, spaceships, etc.), which may have faces or other features that define a front for the bot 100. For example, the bow of a ship may define the front 130 for a bot 100 designed to resemble that ship, while the face of a cartoon character may define the front 130 for an associated bot 100. In embodiments in which the head may swivel independently of the rest of the bot 100 (e.g., on a neck), another feature may be designated to define which side of the bot 100 is the front 130.

Figure 1C:
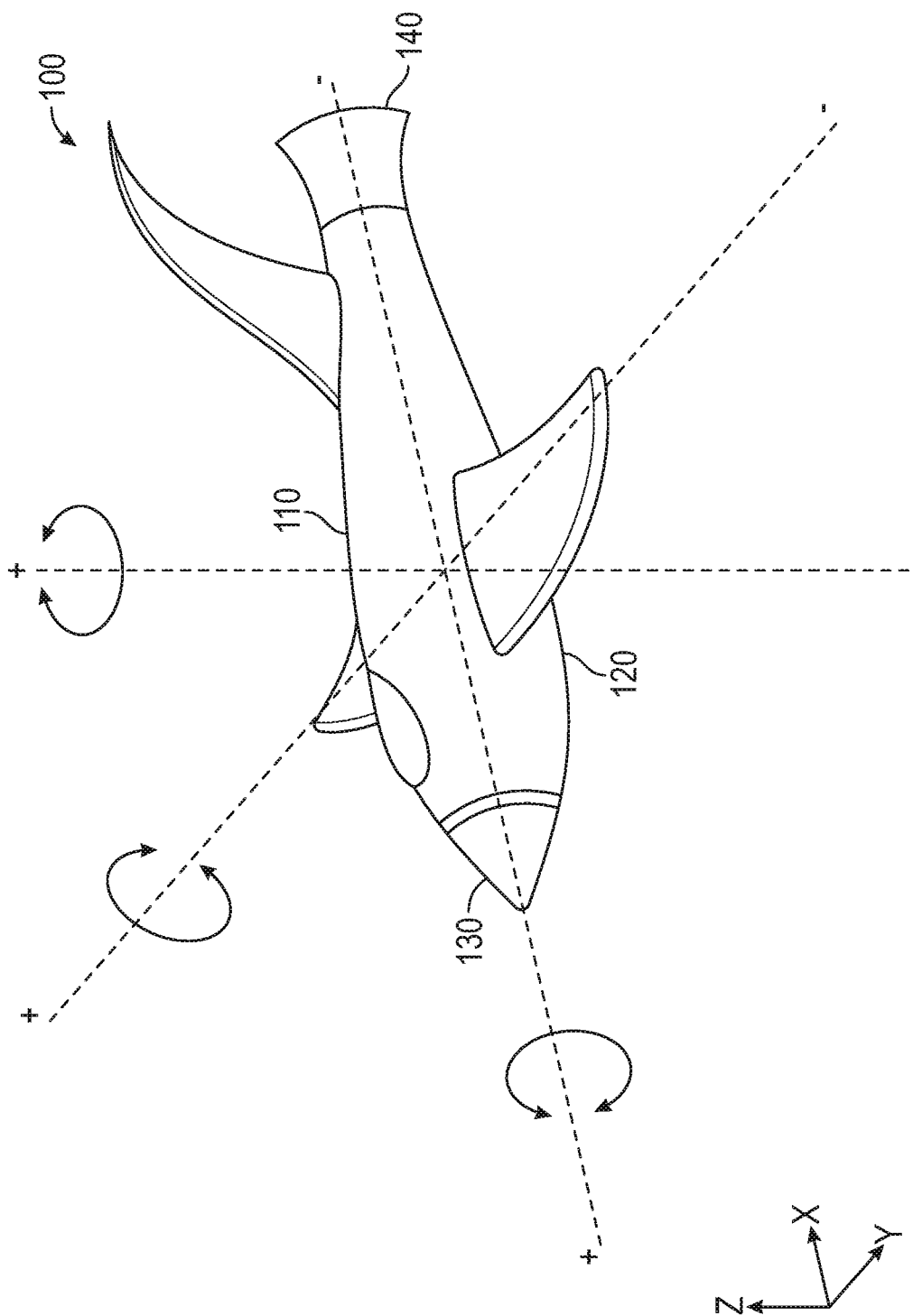

FIG. 1C illustrates one view of an example remotely controlled device of a drone resembling a rocket-ship, which is another example of a bot 100. A drone style bot 100 may move in several planes (e.g., flying through the air, submerging/surfacing in water), and FIG. 1C illustrates several concepts related to movement, navigation, and control of a bot 100. Although Cartesian coordinates are used to describe the motion of the bot 100, other coordinate systems may be used with internal or external references points (relative to the bot 100) in other embodiments.

A longitudinal axis runs from the front 130 of the bot 100 to the back 140 of the bot 100, and motion along the longitudinal axis may be classified as forward (positive) or backward (negative) along the longitudinal axis. Rotation about the longitudinal axis is referred to as roll.

A transverse axis runs from one side of the bot 100 to the other side of the bot 100, and motion along the transverse axis may be classified as leftward (negative) or rightward (positive). Rotation about the transverse axis is referred to as pitch.

A vertical axis runs from the top 110 of the bot 100 to the base 120 of the bot 100, and motion along the vertical axis may be classified as upward (positive) or downward (negative). Rotation about the vertical axis is referred to as yaw.

The longitudinal, transverse, and vertical axes are independent of the environmental X, Y, and Z axes used to map space in the environment. The bot 100 may track location and orientation in the environment via a tuple of X, Y, Z, yaw, pitch, and roll values. As used herein, the 6-tuple defines the position of the bot 100 in the environment, whereas the 3-tuple of (X,Y,Z) defines the location of the bot 100 in the environment, and the 3-tuple of (yaw, pitch, roll) defines the orientation of the bot 100 in the environment. The individual values in this 6-tuple may be based on a change relative to an initial starting position in the environment, one or more points of orientation in the environment, and combinations thereof. For example, the bot 100 may track pitch values relative to the visible horizon or an internal level/gyroscope; Z values relative to sea level, a starting altitude, an altitude relative to what is currently beneath the base 120 of the bot 100; X and Y values relative to a distance traveled from a starting point, a latitude/longitude; etc.

Figure 2:
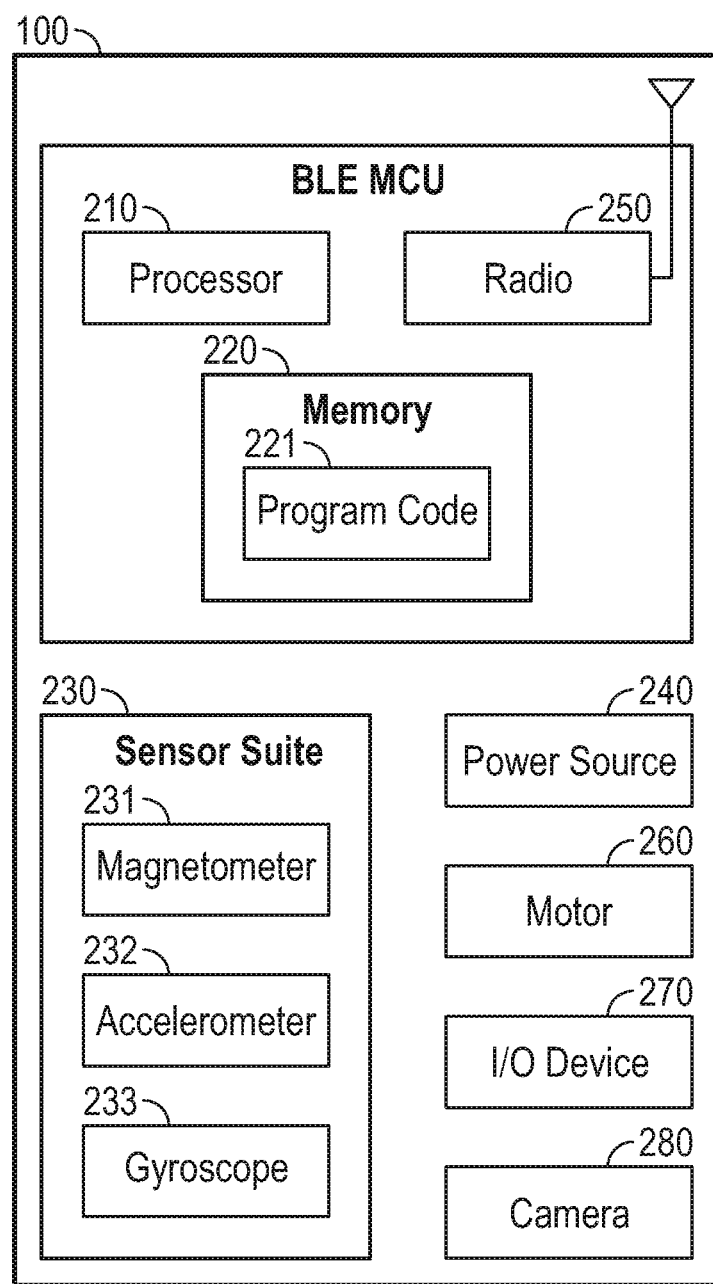
FIG. 2 is a block diagram of the internal components of a remotely controlled device according to aspects of the present disclosure.

FIG. 2 is a block diagram of the internal components of a bot 100. The internal components of a given bot 100 may vary from those illustrated in FIG. 2, and several instances of each component may be included in a given bot 100. The internal components include a processor 210, a memory 220, a sensor suite 230, a power source 240, a motor 260, a radio 250, and may include other input or output (I/O) devices 270 (e.g. LED, IR transmitter/receivers, speaker, buttons, microphones, light sensors, etc.). In various embodiments, the processor 210, the memory 220, and the radio 250 may be integrated into a Microcontroller (MCU) on a single hardware chip or circuit board.

The processor 210 and the memory 220 provide computing functionality to the bot 100. The memory 220 may be one or more memory devices, such as, for example, Random Access Memory (RAM), Read Only Memory (ROM), flash memory, or any other type of volatile or non-volatile storage medium that includes instructions that the processor 210 may execute to affect the bot 100. The processor 210, which may be any computer processor capable of performing the functions described herein, executes commands included in the instructions, which may include performing certain tasks in response to signals received via the sensor suite 230 or the radio 250.

The memory 220 generally includes program code 221 for performing various functions related operating the bot 100. The program code 221 is generally described as various functional "applications" or "modules" within the memory 220, although alternate implementations may have different functions and/or combinations of functions. Within the memory 220, the program code 221 is generally configured to control the bot 100 in relation to commands from one or more users.

The sensor suite 230 may include a magnetometer 231, an accelerometer 232, and a gyroscope 233. The magnetometer 231 is a sensor that provides a bearing to a north pole of a magnetic field in the environment in which the bot 100 is present. The magnetometer 231 may thus provide the bot 100 with a directional sense in terms of yaw orientation with respect to magnetic north. The accelerometer 232, which measures acceleration forces acting on the bot 100, may provide the bot 100 with information of whether the bot 100 (or a portion of the bot 100) is moving, and in which direction(s). The gyroscope 233 measures orientation of the bot (or a portion of the bot 100), and may provide the bot 100 with information of whether the bot 100 (or portion of the bot 100) is level (e.g., whether the bot 100 is standing or has been knocked over). The combination of the accelerometer 232 and gyroscope 233 may thus provide the bot 100 with a direction sense in terms of pitch and roll with respect to gravity. The magnetometer 231 may be described as providing yaw information on the orientation of the bot 100 (e.g., how many degrees from north the front 130 is oriented), while the accelerometer 222 and gyroscope 233 provide information related to the pitch and roll of the orientation of the bot 100.

The sensor suite 230 may include additional sensors, several instances of each sensor, or may omit some of the example sensors discussed herein. For example, a bot 100 may include an infrared emitter and/or receiver to identify objects within the environment. In another example, the bot 100 may include a laser range finder sensor to determine a distance to an object from the bot 100 in the environment.

In a further example, the bot 100 may include a camera sensor including image recognition software to identify objects within the environment and/or provide an image to a user from the perspective of the bot 100.

The power source 240 provides electric power to the various components of the bot 100. Various examples of power sources 240 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 240.

The radio 250 provides wireless communications for the bot 100. In some embodiments, the radio 250 is a receiver, which receives signals from external sources to inform how the bot 100 is to behave. In other embodiments, the radio 250 is a transmitter/receiver, which receives signals from external sources to inform how the bot 100 is to behave, and transmits signals to external devices (e.g., other bots 100, a paired controller for the bot 100). The radio 250 may be in communication with various antennas and may configure messages to be transmitted or received according to various standards, such as, Bluetooth Low Energy (BLE) or a proprietary standard.

The motors 260 included in the bot 100 are provided for locomotion and/or actuation of the bot 100. For example, a motor 260 disposed in an elbow joint of the bot 100 may affect an actuation of an arm; flexing, relaxing, or rotating that arm at the elbow joint. In another example, a motor 260 connected with a drive wheel in the base 120 of the bot 100 may induce the bot 100 to move forward, in reverse, and/or turn left or right. In a third example, a motor 260 connected as a pinion with a rack that is connected with one or more wheels may induce the bot 100 to steer when locomotion is supplied by another motor 260. In various embodiments, the motors 260 are electrical motors that are selectively provided power from the power source 240 based on instructions executed but the processor 210. The motors 260 may provide locomotive force, actuation of various portions of the bot 100 (e.g., arms, legs, hands, necks), and/or vibration (e.g., rotating an off-centered weight). In some embodiments, the motors 260 include positional sensors to provide the processor 210 with information related to a rotational position affected by the motor 260 (e.g., rotated d degrees from a reference point).

The I/O devices 270 may include various lights, displays, and speakers for providing output from the bot 100 in addition to that provided by the motors 260 and/or radio 250. For example, a Light Emitting Diode (LED) is an I/O device 270 that provides a visual effect for the bot 100 when certain actions are performed by the bot 100. In another example, a speaker is an I/O device 270 that provides audio output (e.g., of a sound effect or voice recording) when certain actions are performed by the bot 100.

Figure 3:
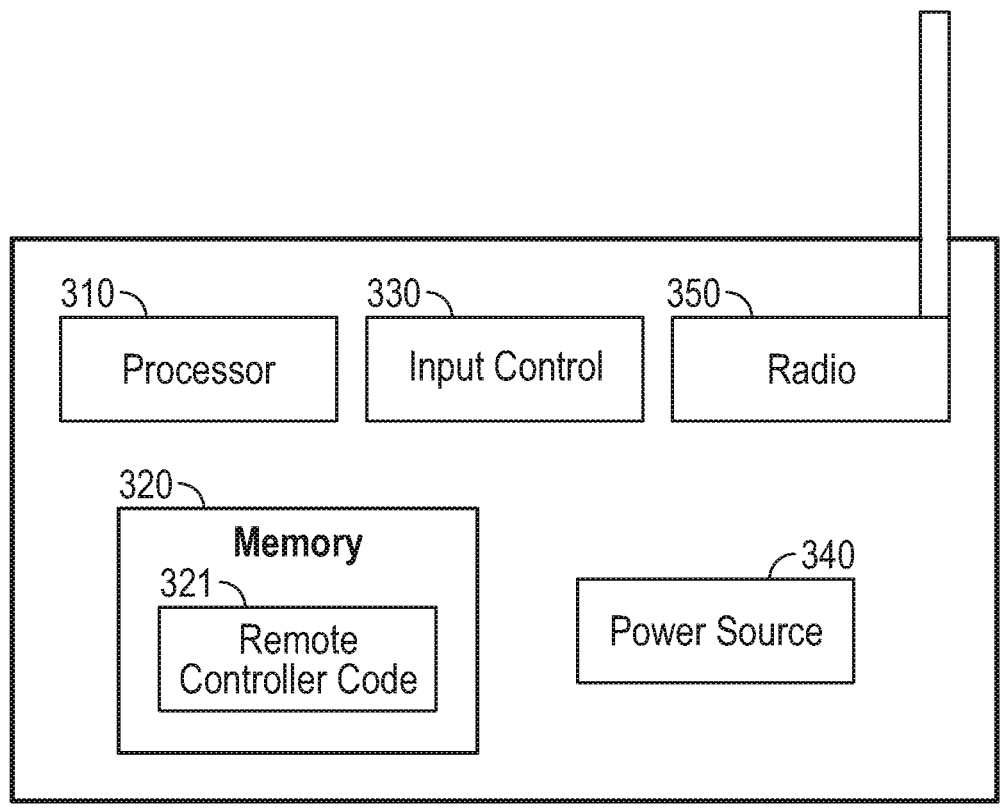
FIG. 3 illustrates an example Remote Control (RC) for use with a remotely controlled device according to aspects of the present disclosure.

FIG. 3 illustrates an example Remote Control (RC) for use with a robotic action figure. A remote control may generally or collectively be referred to herein as an RC 300, RCs 300, or RCs 300n. Specific examples of an RC 300 may be distinguished from one another by various titles and postscripts after the associated element number (e.g., first RC 300a, second RC 300b). Each RC 300 may be primarily keyed to control one bot 100, and when specific examples of paired RC 300 and bots 100 are given herein, the given titles and subscripts for the given bot 100 and RC 300 will match. For example, Alex may control a first bot 100a using a first RC 300a, whereas Blake may control a second bot 100b using a second RC 300b, and Charlie may control a third bot 100c using a third RC 300c.

The processor 310 and the memory 320 provide computing functionality to the RC 300. The memory 320 may be one or more memory devices, such as, for example, Random Access Memory (RAM), Read Only Memory (ROM), flash memory, or any other type of volatile or non-volatile storage medium that includes instructions that the processor 310 may execute to affect the bot 100 via the RC 300. The processor 310, which may be any computer processor capable of performing the functions described herein, executes commands based on inputs received from the input controls 330. In some embodiments, the memory 320 may queue instructions for transmission to the bot 100.

The memory 320 generally includes program code for performing various functions related operating the RC 300. The program code is generally described as various functional "applications" or "modules" within the memory 320, although alternate implementations may have different functions and/or combinations of functions. Within the memory 320, the remote controller code 321 is generally configured to provide functionality to remotely control the bot 100 in relation to commands from one or more users. In some embodiments, the remote controller code 321 is provided to manage inputs from a purpose-built RC 300 (i.e., a dedicated remote control), while in other embodiments the remote controller code 321 is provided to enable a general computing device (e.g., a smart phone, a tablet computer, a laptop computer) to provide control signals to a bot 100.

The RC 300 includes one or more input controls 330 to receive input from a user to thereby control the bot 100 at a distance. The input controls 330 may include physical joysticks, physical steering wheels/yokes, physical buttons, physical switches, and a touch interface that designates various regions for use as virtual joysticks, buttons, switches, etc. A user may manipulate the various input controls 330 to signal that the bot 100 is to perform a desired action (e.g., move forward, play an audio clip, steer to the right, raise an arm, twist), which the processor 310 may interpret and transmit to the bot 100 via the radio 350.

The power source 340 provides electric power to the various components of the RC 300. Various examples of power sources 340 include batteries (rechargeable and non-rechargeable), Alternating Current to Direct Current (AC/DC) converters, Direct Current to Alternating Current (DC/AC) converters, transformers, capacitors, inductors, and wiring to connect to an external power source 340.

The radio 350 provides wireless communications for the RC 300. In some embodiments, the radio 350 is a transmitter, which transmits signals to external devices (e.g., bots 100) to inform how a bot 100 is to behave. In other embodiments, the radio 250 is a transmitter/receiver, which receives signals from external sources (e.g., bots 100 and other RCs 300) to inform how a given bot 100 or RC 300 is behaving, and transmits signals to external devices. The radio 350 may be in communication with various antennas and may configure messages to be transmitted or received according to various standards, such as, BLE or a proprietary standard.

Figure 4:
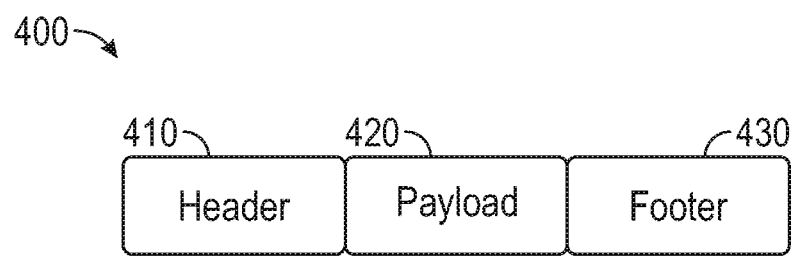
FIG. 4 illustrates an example packet which may be used in various embodiments according to aspects of the present disclosure.

FIG. 4 illustrates an example packet 400 which may be used in various embodiments. The packet 400 represents a formatting for data that are transmitted between a bot 100 and an RC 300. The packet 400 includes a header 410, a payload 420, and a footer 430. The data in the packet may be formatted as analog or digital values, and the packet 400 may be transmitted via one or more of Amplitude Modulation (AM), Frequency Modulation (FM), or Phase Modulation (PM) in various frequency bands according to the standard selected for communication between the bots 100 and RCs 300.

The header 410 represents a portion of the packet 400 that is transmitted/received first in the packet 400. The header 410 may contain information related to the sender, the intended destination, the standard used to transmit the packet 400, a length of the packet 400, whether the packet 400 is one of a series of packets 400, error detection/correction information, etc. The device that receives the packet 400 may examine the header 410 to determine whether to read the payload 420 or ignore the packet 400. For example, a first bot 100a and a second bot 100b may both receive a packet 400 and analyze the header 410 to determine whether the packet 400 includes a payload 420 that the given bot 100 should execute.

The payload 420 includes the data, commands, and instructions. In various embodiments, one packet 400 may be the payload 420 of another packet 400. For example, an RC 300 may transmit an outer packet 400 formatted according to a first standard with a payload 420 of an inner packet 400

In various aspects, and depending on the format used for the packet 400, the footer 430 may be omitted.

Figure 5A:
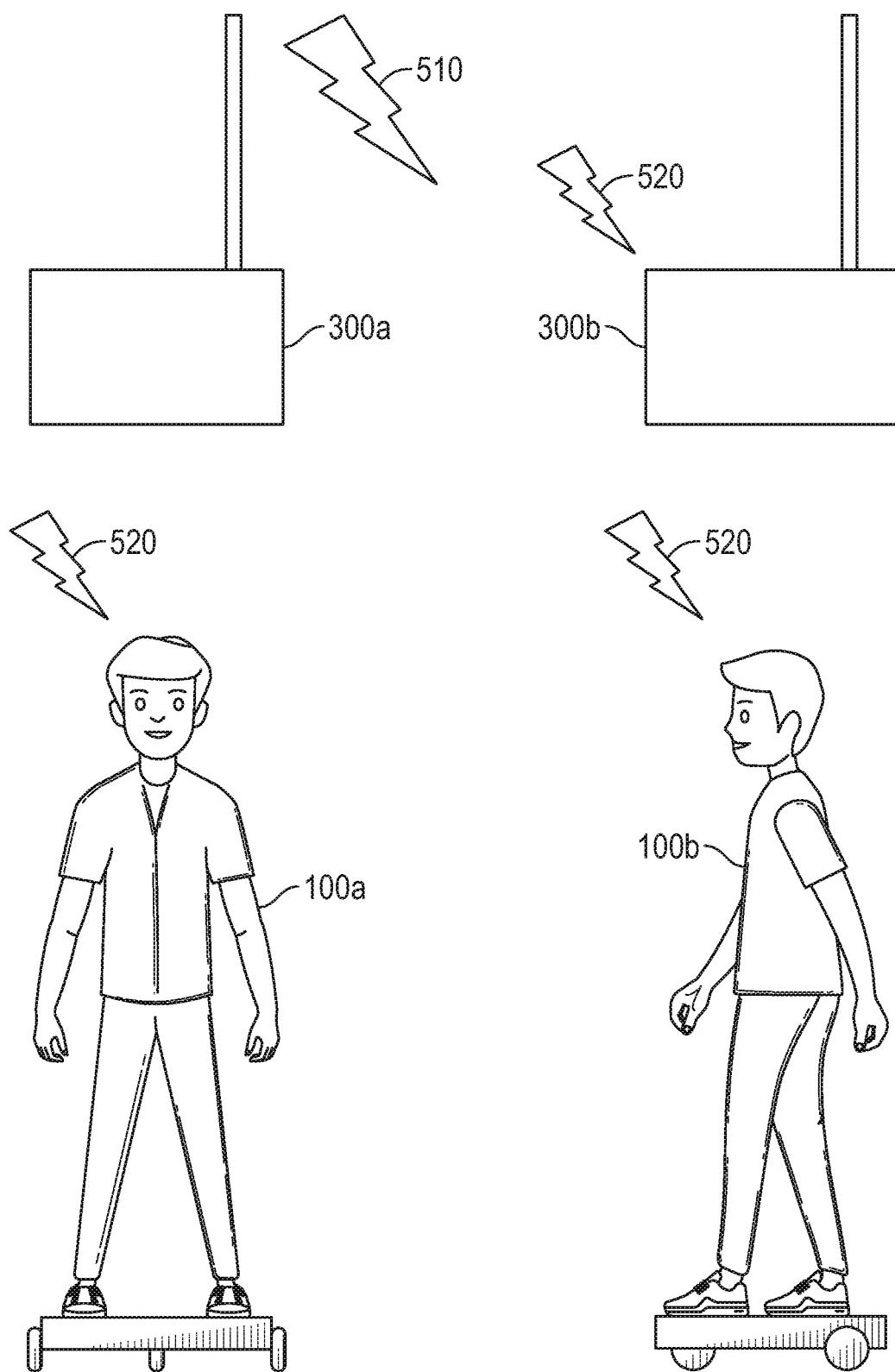
FIGS. 5A and 5B illustrate various examples scenes in which several robotic action figures and remote controllers are interacting according to aspects of the present disclosure.
Figure 5B:
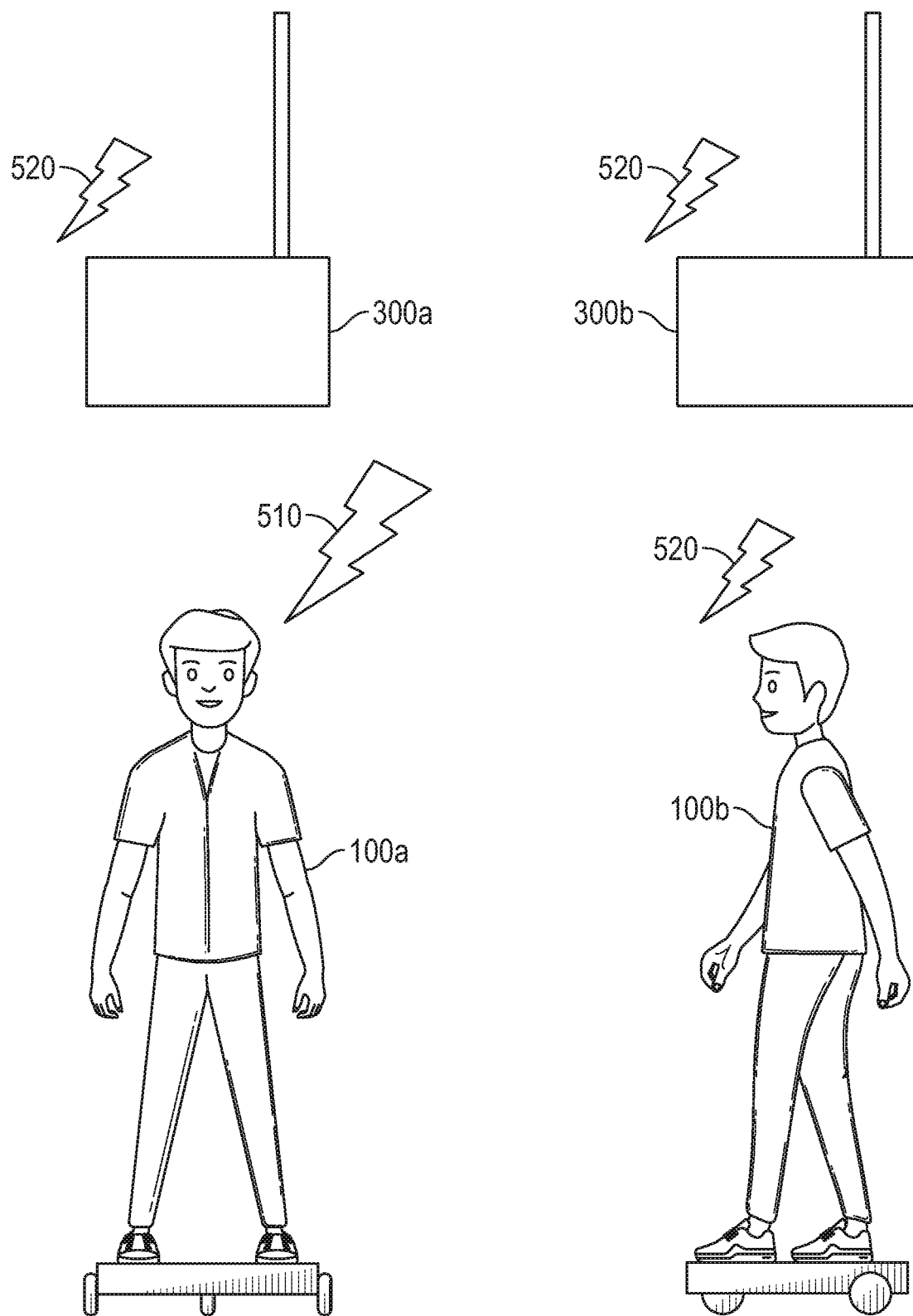

FIGS. 5A and 5B illustrate various examples scenes in which several robotic action figures and remote controllers are interacting. Each bot 100 in the example scenes is associated with a corresponding RC 300 as the primary RC 300 for that bot 100. In various embodiments, each RC 300 and each bot 100 may send and receive various signals that may be intended for one specific target, intended for several targets, or intended for all targets. In various embodiments, the signals from multiple bots 100 or RCs 300 may be distinguished from one another by one or more of Frequency Division Multiplexing (FDM), Time Division Multiplexing (TDM), and information in the header 410 that identifies the transmitter and intended receiver. The messages may be encoded onto the various signals by one or more of Amplitude Modulation, Frequency Modulation, or Phase Modulation of the signal.

A message transmitted from a given bot 100 or a given RC 300 may be received by various other bots 100 or RCs 300. As used herein, the bots 100 or RCs 300 that receive the signal and successfully extract the message from the signal are referred to as "in range" (and variations thereof) of the transmitting device. A device may use one or more of a signal strength, a checksum, or a message format to determine whether the message has been successfully extracted from the signal. When using multiple devices, not all devices need to be in range of one another for the devices to interact. For example, a first bot 100a and a second bot 100b may both be in range of a first RC 300a and a second RC 300b and may interact with one another without needing the first RC 300a and the second RC 300b to be within range of each other. Individual in-range devices may act as repeaters for devices out of range of one another (i.e., re-transmitting the message received from a first transmitter to reach devices out of range of the first transmitter but in range of the repeater device) or devices out of range of one another may operate independently of the signals from out of range devices.

Several devices may be in range of a transmitting device, and may determine whether to execute or ignore any instructions included in the message. For example, with a first bot 100a, a second bot 100b, and a second RC 300b all in range of a first RC 300a, the first bot 100a may execute instructions included in a message from the first RC 300a while the second bot 100b and the second RC 300b may ignore the message. A receiving device may determine whether to execute or ignore a message based on one or more of: an identifier in the header 410 of a packet 400 of the message (identifying a sender, an intended receiver, or a message type), a time at which the message was received, a frequency of the signal used to transmit the message, or the like.

In FIG. 5A, a first RC 300a is associated as the primary controller for a first bot 100a, and a second RC 300b is associated as the primary controller for a second bot 100b. The first RC 300a is shown as a transmitting device that generates a generated signal 510. The generated signal 510 is received as a received signal 520 at each of the first bot 100a, the second bot 100b, and the second RC 300b. The generated signal 510 may include one or more packets 400 that include various messages for the various devices that receive the command signal 510. For example, the generated signal 510 may be a move command from the first RC 300a to the paired first bot 100a to move within the environment. In another example, the generated signal 510 may be a broadcast signal that is intended to identify the first RC 300a to the other devices in the environment. The generated signal 510 transmitted by the first RC 300a may be intended for one bot 100, for multiple bots 110n, for one RC 300, for multiple RCs 300n, for one paired RC 300 and bot 100, or for all RC 300 and all bots 100.

In FIG. 5B, a first RC 300a is associated as the primary controller for a first bot 100a, and a second RC 300b is associated as the primary controller for a second bot 100b. The first bot 100a is shown as a transmitting device that generates a generated signal 510. The generated signal 510 is received as a received signal 520 at each of the first RC 300a, the second bot 100b, and the second RC 300b. The generated signal 510 may include one or more packets 400 that include various messages for the various devices that receive the command signal 510. For example, the first bot 100a may transmit telemetry or sensor data from a sensor suite 230 to the paired first RC 300a to update the first RC 300a for a status of the first bot 100a. In another example, the first bot 100a may re-transmit a generated signal 510 received from the first RC 300a, thereby acting as a repeater device. In a further example, the first bot 100a may transmit the generated signal 510a to alert nearby devices of a condition of the first bot 100a (e.g., entering the environment, health-points in a game, command confirmation).

Figure 6:
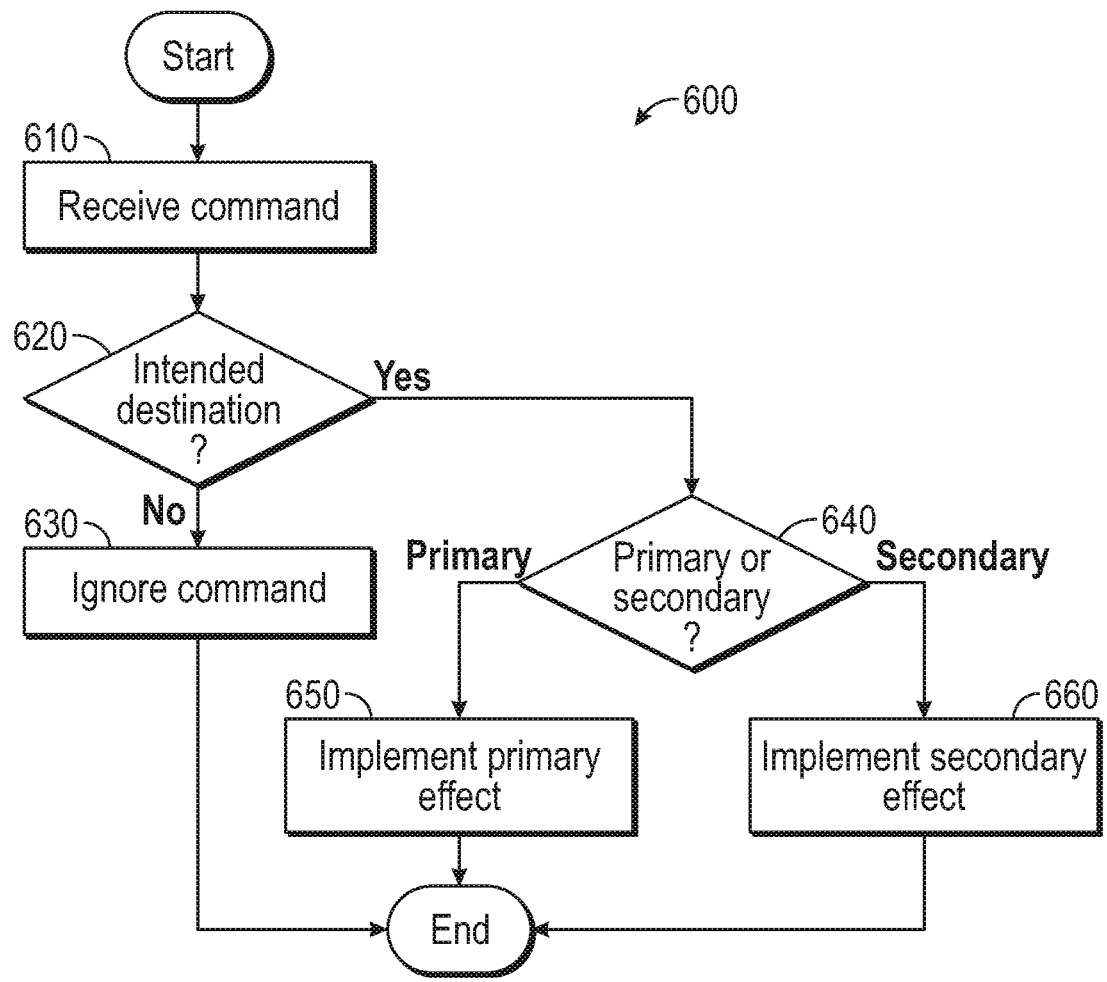
FIG. 6 illustrates a method for handling commands in a swarm using secondary robotic commands according to aspects of the present disclosure.

FIG. 6 illustrates a method for handling commands in a swarm using secondary robotic commands. Method 600 begins with block 610, where a device (either a bot 100 or an RC 300) receives a command. The command may be a command that was generated and transmitted by an RC 300 or a bot 100 in range of the receiving device. In some embodiments, the command may be retransmitted between devices in the environment to expand the range of the signal from the initial transmitting device to include the transmitting range of each of the devices (e.g., bots 100 and RCs 300) in range of at least one other device in the swarm.

At block 620, the receiving device determines whether that receiving device is an intended destination for the command received at block 610. In various embodiments, the receiving device bases the determination of whether the receiving device is an intended destination on one or more of: a time window in which the command was received, a frequency on which the command was carried, and a device identifier in a header 410 of a packet 400 for the command. Additionally or alternatively, in some embodiments, the receiving device bases the determination of whether the receiving device is an intended destination on one or more of: a signal strength or signal to noise ratio for the signal carrying the command, whether the command indicates that the command is a retransmittal, whether the command was received within a designated time from transmission, whether the transmitting device is also the receiving device (e.g., signal echo), whether a command has multiple potential effects, and whether a checksum or other error-proofing measure for the packet 400 returns a match for the payload 420.

As discussed herein, a receiving device in a swarm receives a signal that includes a command with various effects. In some embodiments, the command is a single-device command (e.g., active motors 260 for locomotion), and the receiving device determines whether to implement that command based on whether the receiving device is an intended destination for that command. For example, the command may specify the intended destination in a header 410 portion of a packet 400, and any device that receives the command and does not have an identifier matching the intended destination in the header 410 may ignore the command. Commands for more than one device in the swarm may specify in the associated packet 400: a null identifier, a known swarm-command identifier (e.g., identifier X may be reserved to indicate that the command is not intended for only one device); an identifier for the swarm in which several devices are participating; a key identifying the packet 400 as including a command with multiple effects, or the like. In other embodiments, for example, when multiple independent swarms are operating nearby, but not in range of each other or on different frequency/time divisions, a receiving device may determine whether to implement a received command based on characteristics of the signal.

When a determination is made at block 620 that the receiving device is not an intended destination for the command, method 600 proceeds to block 630, where the receiving device ignores the command. Method 600 may then conclude.

When a determination is made at block 620 that the receiving device is an intended destination for a command, method 600 proceeds to block 640, where the receiving device determines whether the command should be handled as a primary command or a secondary command. The individual receiving devices may determine that the primary effect is to be performed in response to identifying the transmitting device as a paired device (e.g., a first bot 100a and a first RC 300a are paired devices). In contrast, individual receiving devices may determine that the primary effect is not to be performed in response to identifying the transmitting device as not being a paired device (e.g., a first bot 100a and a second RC 300b are not paired devices, a first bot 100a and a second bot 100b are not paired devices, a first RC 300a and a second RC 300b are not paired devices). In various embodiments, the individual receiving devices determine to perform a secondary effect in response to the command if the primary effect is not performed.

Although the present disclosure discusses commands as having a "primary" or a "secondary" effect on a receiving device, a single command may have n different effects on n receiving devices in a swarm which are classified as being "primary" or "secondary" based on whether the command initiates an action on the receiving device or initiates a reaction on the receiving device. Each device in the swarm independently determines whether to act or react to the command, thus allowing devices in the swarm to interact without physical interaction or a priori knowledge of the other members of the swarm beyond the paired device.

For example, consider a command to elicit a "black hole" effect in a swarm of bots 100 representing spaceships to induce the bots 100 to travel to a designated location as though being sucked into a black hole. A first RC 300a may issue the command to the associated first bot 100a, but all the other RCs 300 and bots 100 in range of the first RC 300 will also receive the command. The first bot 110a may interpret that the command as specifying the first bot 100a to perform a primary effect for a "black hole" action sequence based on the command origination from a paired device (i.e., RC 300a). For example, the first bot 100a may engage lights, speakers or other I/O devices 270 and/or active various motor 260 that correspond to the action sequence for generating the black hole effect. Each of the other bots 100 may interpret that command to specify that the given bot 100 is to perform a secondary effect for a "black hole" action sequence based on the command origination from a non-paired device (i.e., RC 300a instead of RC 300n). For example, the a second bot 100b may engage lights, speakers or other I/O devices 270 and/or active various motors 260 that correspond to the action sequence for being "pulled into" the black hole effect.

In another example, a command to elicit a "thunderstorm" effect in a swarm of bots 100 representing super heroes and super villains may have various effects on the bots 100 based on a status in a game. A first RC 300a may issue the command to the associated first bot 100a, but all the other RCs 300 and bots 100 in range of the first RC 300 will also receive the command. The first bot 100a may, based on the command being received from a paired device, determine that the primary effect of the command is to be performed, and begin a sequence of actions that are associated with the "thunderstorm" effect (e.g., making lightning/thunder light and sound effects). A second bot 100b and a third bot 100c may, based on the command being received from a non-paired device, each determine that a secondary effect to the thunderstorm command is to be performed. The second bot 100b may shake (e.g., engage a motor 260) and activate lights or speakers (e.g., I/O devices 270) in response to the primary effect being performed by the first bot 100a, which may include a delay of a predetermined amount of time from when first bot 100a beings the primary effect. In one embodiment, the third bot 100c may represent a character that is "immune to electricity damage" and may perform a different secondary effect than the second bot 100b performs, such as, for example, playing a sound clip of "Your thunderstorm has no effect on me, villain!".

Continuing the super hero example, in embodiments which virtual health points are tracked for each of the bots 100, for example, in a "battle" game between the characters, when the second bot 100b determines that the "thunderstorm" attack has depleted the associated virtual health points for the bot 100, the second bot 100b may perform a "game over" sequence of actions in response to the command in addition to or instead of the secondary effects to reacting to the "thunderstorm". The second bot 100b may track the health points internally so that no additional command need be transmitted for the second bot 110b to perform a "game over" sequence of actions.

In another example, a command to elicit a "magic spell" effect in a swarm of bots 100 representing witches and wizards may have a different range than the command initiating the "magic spell." A first RC 300a may transmit a first signal to issue the command to the associated first bot 100a, but all the other RCs 300 and bots 100 in range of the first RC 300 will also receive the command. The first bot 100a may, based on the command being received from a paired device, determine that the primary effect of the command is to be performed, and begin a sequence of actions that are associated with the "magic spell" effect (e.g., playing an incantation sound file) including transmitting a second signal. A second bot 100b and a third bot 100c may, based on the command in the first signal being received from a non-paired device (e.g., the first RC 300a), each determine that a secondary effect to the magic spell command is to be performed, which in the present example is to perform no action unless the second signal is also received from the first bot 100a. Consider in this example that the second bot 100b receives the second signal from the first bot 100a, but that the third bot 100c does not receive the second signal from the first bot 100a. In this example, the second bot 100b may perform a secondary effect associated with the "magic spell" being cast by the first bot 100a, while the third bot 100c may perform no action (e.g., a null response) as the secondary effect in response to the "magic spell". In various aspects, the first bot 100a may issue a second signal to affect a subset of the other bots 100 in the swarm by using a lower broadcast power than the first signal, by using a directional transmitter, by using a different transmission frequency or carrier (e.g., IR, laser, sound, etc. versus radio).

When a determination is made at block 640 that the receiving device is to perform the command as a primary command, method 600 proceeds to block 650, where the receiving device implements the primary effect of the received command. Method 600 may then conclude.

When a determination is made at block 640 that the receiving device is to perform the command as a secondary command, method 600 proceeds to block 660, where the receiving device implements the secondary effect of the received command. Method 600 may then conclude.

Figure 7:
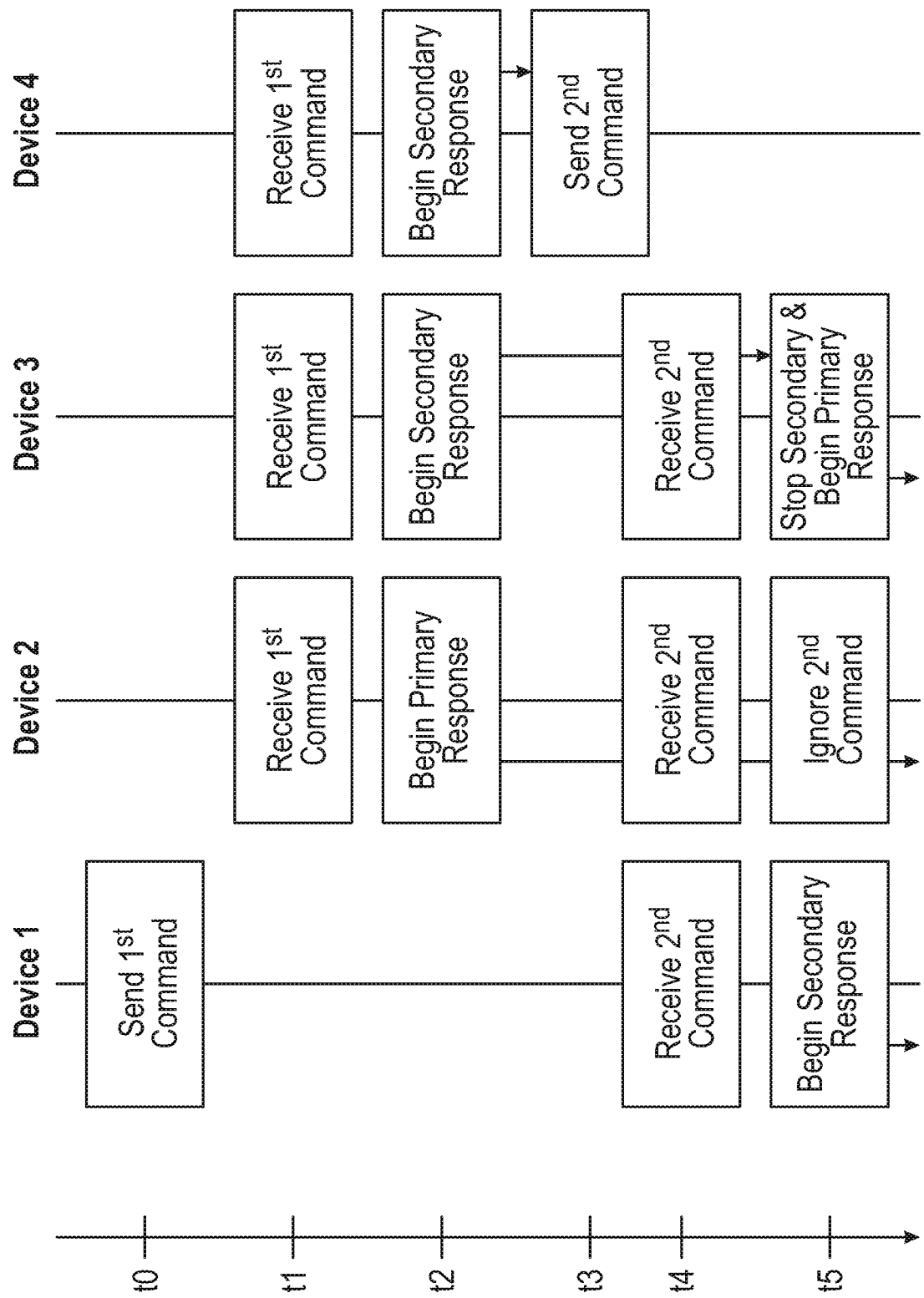
FIG. 7 illustrates an example timing diagram for several devices responding to commands in a swarm according to aspects of the present disclosure.

FIG. 7 illustrates an example timing diagram for several devices responding to commands in a swarm. Each of the devices illustrated in FIG. 7 may be a bot 100 or an RC 300, and more or fewer devices with different interaction patterns than those shown in the example timing diagram may be used in other embodiments.

Consider, for example, a scenario where a first user (via a first RC 300a) signals an associated first bot 100a to interact with a second bot 100b (paired with a second RC 300b controlled by a second user) via a "magic spell" command. In this example, the first bot 100a and the first RC 300a may have no knowledge of the second bot 100b or the second RC 300b being part of the swarm, but the first user desires for the first bot 100a to interact with the second bot 100b. With reference to the example timing diagram, the first RC 300a, as the first device, transmits a first command related to the magic spell at time $t_0$. Each bot 100 or RC 300 that receives the first command may independently determine how (or if) that device is to react to the command, without the device needing to know that the receiving devices are part of the swarm.

By time $t_1$, each of the other devices in the swarm has received the first command. Each of the devices that received the first command by time $t_1$ determines by time $t_2$ how to react to the first command, for example, as described in method 600 in relation to FIG. 6, and at time $t_2$ begins reacting to the command accordingly. As shown in FIG. 7 at time $t_2$, the second device reacts to the first command as a primary command, and begins a primary response, the third devices reacts to the first command as a secondary command, and begins a secondary response, and the fourth device ignores the first command.

The responses begun at time $t_2$ in the timing diagram may continue until a later time until completed, stopped by a stop-command, or interrupted by an intervening command, as indicated by the arrows and later actions in the timing diagram. A response may have several phases, including a pre-reaction phase that allows a user to be alerted to the potential secondary effect and for several bots 100 and RCs 300 to coordinate actions. For example, starting at time $t_2$, a first bot 100a that received the first command may react by raising an arm, activating a light, playing a sound, etc., while a second bot 100b that also received the first command may wait n milliseconds after time $t_2$ before performing an action, so that a user for the second bot 100b may be warned by the actions of the first bot 100a and signal the second bot 100b to take countermeasures to the upcoming action of the first bot 100a.

Continuing the "magic spell" example in relation to the timing diagram, consider that the first bot 100a corresponds to the second device, the second bot 100b corresponds to the third device, and the second RC 300b corresponds to the fourth device. The first bot 100a, as paired with the first RC 300a, receives the first command and interprets that the first bot 100a is to perform a primary response to the first command, such as by raising the arms of the bot 100a, using a speaker for the bot 100a to begin playing back a sound file for an "incantation", activating an LED associated with a magic wand held by the bot 100a, etc. The second bot 100b, as not paired with the first RC 300a that sent the first command, receives the first command and interprets that the second bot 100b is to perform a secondary response to the first command, such as activating a motor 260 in the second bot 100b to shake/vibrate the bot 100b (as though the character embodied by the second bot 100b is afraid of the magic spell being cast by the character embodied by the first bot 100a), to cause the second bot 100b to react to commands from the first device as primary commands (as through though the character embodied by the second bot 100b is "mind controlled"), to cause the second bot 100b to differently interpret or ignore commands from a given device (as through though the character embodied by the second bot 100b is confused or protected from another character). The second RC 300b, as not paired with the first RC 300a, receives the first command and interprets that the second RC 300b is to perform a secondary response to the first command, such as alerting a user that the first bot 100a has begun casting a spell, vibrating in anticipation of the spell casting being complete, or changing how the second RC 300b transmits inputted commands to the second bot 100b (e.g., reversing left/right and back/forward inputs to simulate the character represented by the second bot 100b being confused by the spell cast by the character of the first bot 100a).

At time $t_3$ in the example timing diagram, the fourth device generates and transmits a second command, and ends the associated secondary response begun at time $t_2$. In the spell example, these actions may correspond to the user of the second RC 300b acknowledging an alert for the upcoming "spell" being cast, the user initiating an action via the second RC 300b to respond to the first command, or the like.

By time $t_4$, each of the first, second, and third devices in the swarm has received the second command. Each of the devices that received the second command by time $t_4$ determines by time $t_5$ how to react to the second command, for example, as described in method 600 in relation to FIG. 6, and at time $t_5$ begins reacting to the command accordingly.

Continuing the spell casting example, if the second command is a "counter spell" for the second bot 100b to perform to avoid the effects of the "magic spell" that the first bot 100a is casting in response to the first command, once the second bot 100b begins performing a primary response to the second command, the second bot 100b may stop performing the secondary response to the first command, although in other embodiments the second bot 100b may continue performing the secondary response to the first command while performing the primary response of the second command. The second bot 100b may continue performing the "counter spell" specified as the primary effect of the second command for a predetermined amount of time, until cancelled as a primary effect (e.g., the second RC 300b sends a countermanding command), or until cancelled as a secondary effect (e.g., another device "breaks" the "counter spell" with a new command). In the spell casting example, the "counter spell" may have no effect on the first bot 100a, and thus the first bot 100a may ignore the second command at time $t_5$. In contrast, the first RC 100a may begin performing a secondary response to the second command at $t_5$ to alert the user that the "spell" being cast by the character embodied by the first bot 100a is no longer having an effect on the character embodied by the second bot 100b due to the "counter spell" of the second command.

As will be appreciated, the example timeline and associated example "spell casting" commands described in relation to FIG. 7 are provided as non-limiting examples to illustrate how several devices in a swarm may interact with each other without physical interaction and without explicit knowledge of the other devices in the environment via secondary effects for devices in a swarm.

Figure 8A:
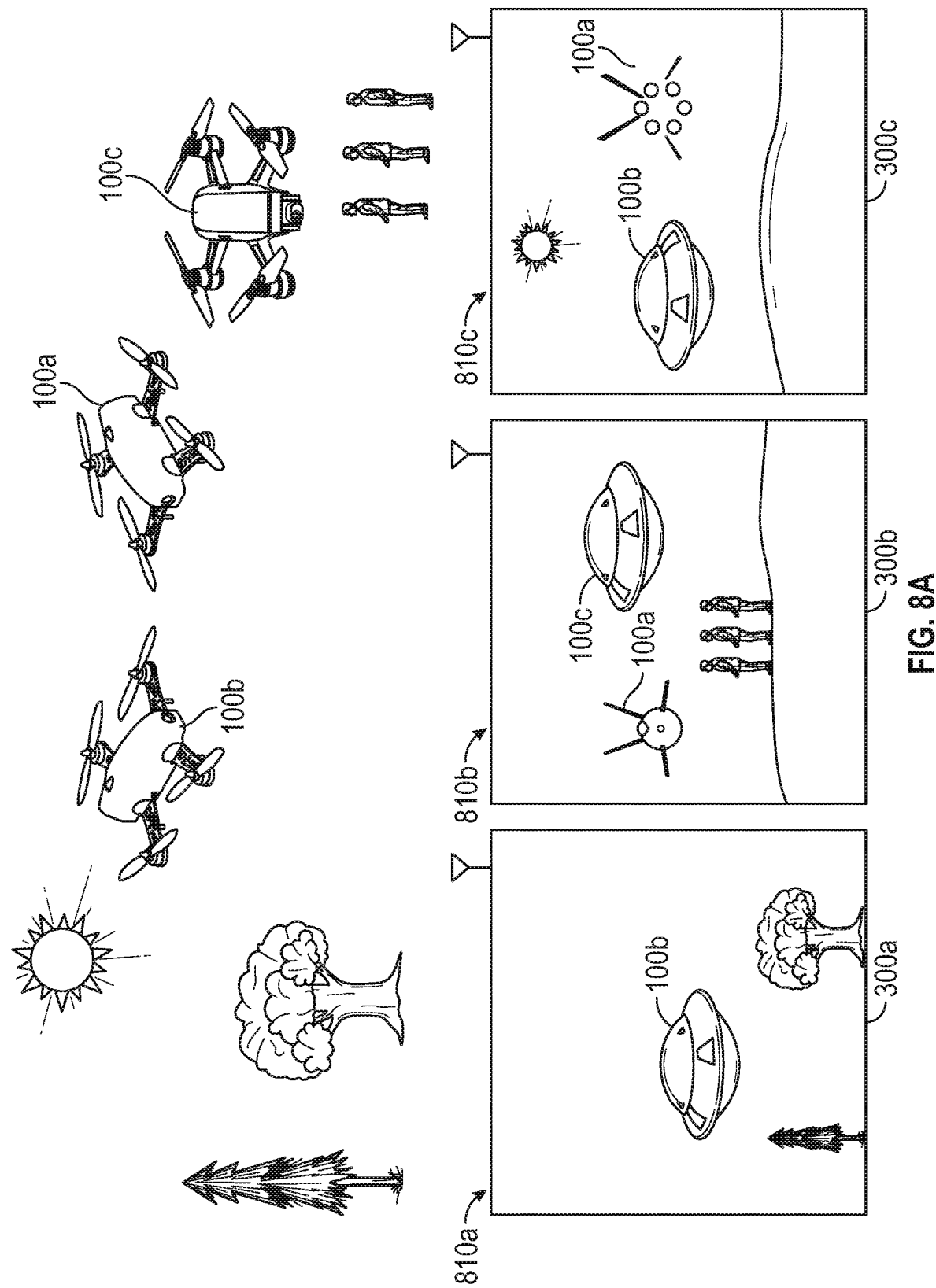
FIGS. 8A and 8B illustrate an example scenario of three users playing with remote controlled devices using secondary robot commands according to aspects of the present disclosure.
Figure 8B:
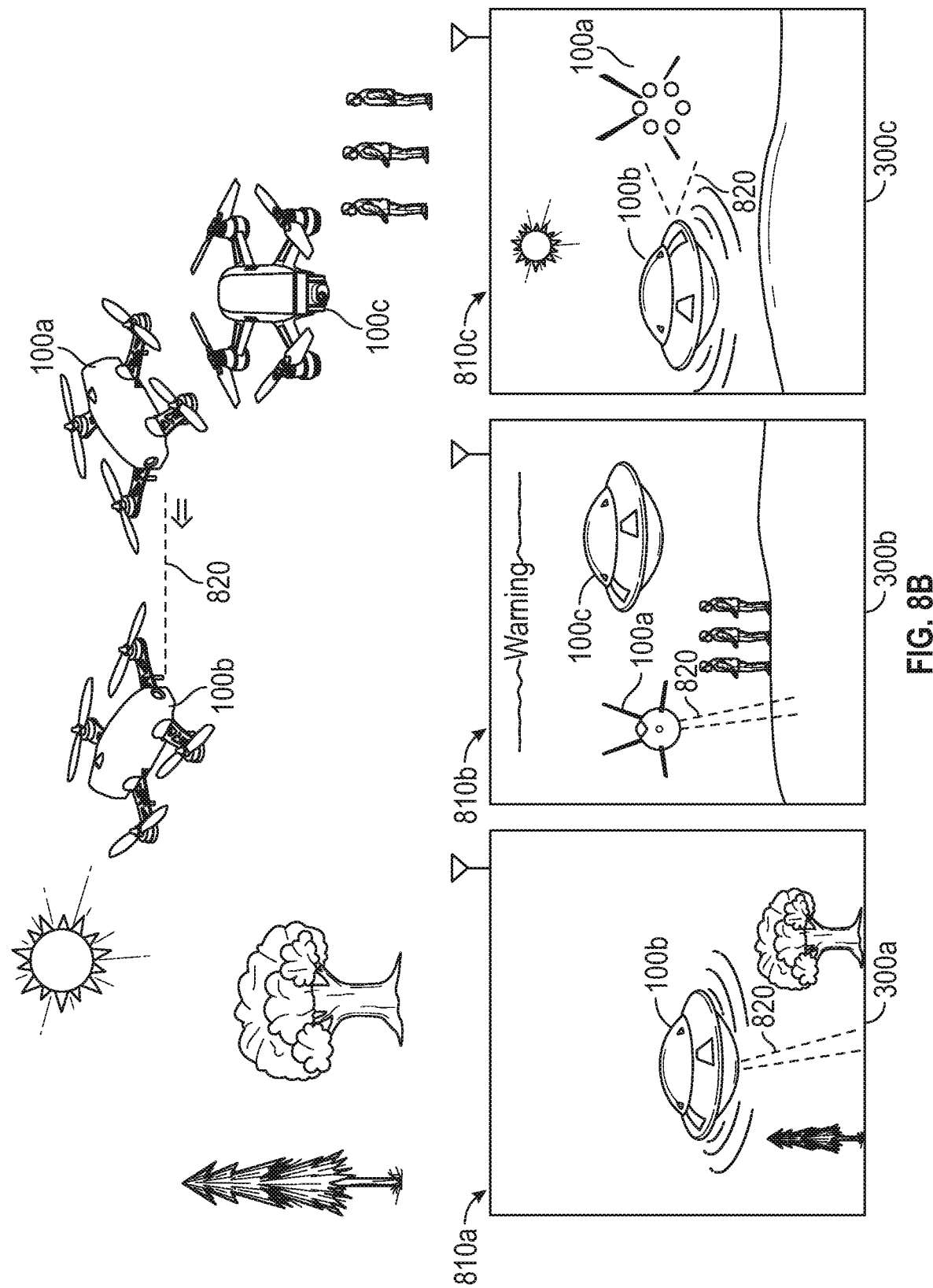

FIGS. 8A and 8B illustrate an example scenario of three users playing with remote controlled devices using secondary robot commands according to aspects of the present disclosure. The example remote control devices are flying, quad-copter drone-style bots 100a-c, which are paired with respective RCs 300a-c, although other styles of bots 100 may be used in different examples. Each of the RCs 300a-c is illustrated as providing an Augmented Reality (AR) experience 810a-c (generally, AR experience 810) to the respective user, overlaying a camera feed provided from a camera 280 included in the paired bot 100 with additional imagery and auditory data to enhance the user experience. In other embodiments, an additional device (e.g., an AR headset) may be provided the camera feed to provide the AR experience 810 in addition to or instead of the RC 300. Although in the illustrated embodiment, the AR experience 810 is provided from the perspective of the bot 100, in other embodiments, the AR experience 810 may be provided from other perspectives (e.g., from the perspective of an AR headset, from the perspective of the RC 300).

In FIG. 8A, the first user is shown a first AR experience 810a on the first RC 300a, showing the second bot 100b as a flying saucer; the second user is shown a second AR experience 810b on the second RC 300b, showing the first bot 100a as a rocket ship (from the front); and the third user is shown a third AR experience 801c on the third RC 300c, showing the first bot 100a as a rocket ship (from the rear) and the second bot 100b as a flying saucer. Each of the bots 100a-c in the illustrated example have identical appearances, but are overlaid with AR imagery to present the bots 100 per definitions of the scenario with different AR appearances. The bots 100a-c transmit a camera feed from one or more onboard cameras 280 to a paired AR device (in the current example, the RCs 300a-c) to display the view from the bot 100 with additional AR imagery. In other embodiments, further AR imagery, such as asteroids, stars, planets, nebulae may be overlaid onto other objects in the environment, or may be added to the AR experience 810 independently of objects recognized from the environment.

In FIG. 8B, the first user, via the first RC 300a, has initiated a command associated with a primary effect and a secondary effect of a "tractor beam," which causes the first bot 100a (as the primary recipient) to initiate a beam action, and which draws any targeted bot 100 (as a secondary recipient) closer to the first bot 100a as a secondary effect. The RCs 300, as secondary recipients, update the AR experiences 810 displayed thereon to include a tractor beam effect as experienced by the paired bot 100.

In response to receiving the command, as part of the "tractor beam" primary effect, the first bot 100a transmits an activating signal 820 to signal one or more devices in the pathway of the activating signal 820 to perform the secondary effect of an associated command (e.g., co-received within a window of time from the signal 510 carrying the command). In the illustrated example, the activating signal 820 is an IR beam generated by an IR transmitter of the first bot 100a. An IR beam is invisible to the users, as infrared is outside of the visible spectrum, but allows the bots 100 to determine whether another bot 100 is within a line-of-sight for determining how to respond to the command. An IR beam is one example of an activating signal 820, which may also include laser-transmitted signals and other directional signals, to enable different remote devices to determine whether to act, react, or ignore a command broadcast in a signal 510

The paired first RC 100a may display an updated first AR experience 810a showing the first user where the IR beam is pointed via a visual image corresponding to the path of the otherwise invisible IR beam. Additional effects (e.g., vibration, warning klaxons) may be provided as part of the updated first AR experience 810a to further enrich the experience of the first user.

The second bot 100b, as part of the "tractor beam" secondary effect and in response to receiving the IR beam from the first bot 100a, moves towards the first bot 100a. An IR receiver on the second bot 100b may receive the IR beam from the first bot 100a to establish that the second bot 100b is to react to the command for the tractor beam effect. The paired second RC 100b, in response to the command, may display an update second AR experience 810b showing the second user that the IR beam from the first bot 100a has intercepted the second bot 100b as the secondary effect of the command. Additional effects (e.g., vibration, warning klaxons) may be provided as part of the updated second AR experience 810b to further enrich the experience of the second user.

The third bot 100c, in contrast to the second bot 100c, does not receive the IR beam from the first bot 100a (e.g., because an IR receiver of the third bot 100c is not in a line-of-sight with the IR emitter of the first bot 100a), and may ignore the command for the tractor beam effect. The paired third RC 300c, as a secondary effect to the command for the tractor beam effect, may display an update third AR experience 810c showing the third user that the IR beam from the first bot 100a has intercepted the second bot 100b. Additional effects (e.g., vibration, warning klaxons) may be provided as part of the updated third AR experience 810c to further enrich the experience of the third user.

In the present disclosure, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, at a plurality of devices in a swarm of devices, wherein the swarm of devices is an ad hoc swarm configured to communicate via a shared protocol, a packet included in a signal broadcast within an environment from a transmitting device in the swarm of devices;
   wherein each receiving device of the swarm of devices:
      parses the packet for a command associated with a primary effect and a secondary effect;
      in response to determining that the receiving device is paired with the transmitting device, implements, by the receiving device, the primary effect; and
      in response to determining that the receiving device is not paired with the transmitting device, implements, by the receiving device, the secondary effect.

2. The method of claim 1, further comprising:
   in response to determining that the receiving device is not an intended destination of the packet, ignoring the packet.

3. The method of claim 2, wherein determining that the receiving device is not the intended destination of the packet includes determining at least one of:
   that the receiving device is the transmitting device;
   that the transmitting device is not part of the swarm of devices;
   that a signal carrying the packet fails to satisfy a signal to noise ratio;
   that an activating signal is not co-received with the signal;
   that the packet was received at a time later than a time threshold from a time of transmission;
   that the packet is a re-transmittal of an earlier-received packet;
   that a checksum included in the packet does not match a payload for the packet; and
   that the command is not associated with secondary effects for the receiving device.

4. The method of claim 1, wherein the receiving device is a robotic device and the transmitting device is a remote controller paired with a different robotic device in the swarm of devices.

5. The method of claim 1, wherein the receiving device is a first remote controller paired with a first robotic device in the swarm of devices and the transmitting device is a second remote controller paired with a second robotic device in the swarm of devices.

6. The method of claim 1, wherein determining that the receiving device is paired with the transmitting device identifies that the receiving device is a remote controller and the transmitting device is a robotic device paired with the remote controller.

7. The method of claim 1, wherein the receiving device is a first robotic device paired with a first remote controller and the transmitting device is a second robotic device paired with a second remote controller.

8. The method of claim 1, wherein the receiving device further transmits a camera feed to an Augmented Reality (AR) device paired with the receiving device to produce AR imagery associated with the command.

9. The method of claim 1, further comprising:
   receiving, after implementing the secondary effect at the receiving device, a second packet included in a second signal broadcast within the environment from a different transmitting device in the swarm of devices;
   stopping the secondary effect;
   in response to determining that the receiving device is paired with the different transmitting device:
      parsing the second packet for a second primary effect; and
      implementing, by the receiving device, the second primary effect; and
   in response to determining that the receiving device is not paired with the different transmitting device:
      parsing the second packet for a second secondary effect; and
      implementing, by the receiving device, the second secondary effect.

10. A computer program product for handling secondary robot commands in robot swarms, the computer program product comprising:
    a non-transitory computer-readable storage medium having computer-readable program code that when executed by a processor, enable the processor to:
       receive a packet at a receiving device;
       identifying, based on the packet, whether the receiving device is one of a primary recipient for the packet in an ad hoc swarm of devices communicating via a shared protocol or a secondary recipient for the packet in the ad hoc swarm; and
       implementing one of a primary effect or a secondary effect on the receiving device respectively based on whether the receiving device is identified as the primary recipient or the secondary recipient.

11. The computer program product of claim 10, wherein the packet is ignored in response to determining that the receiving device is an unintended recipient for the packet.

12. The computer program product of claim 10, wherein the packet includes one command that different devices in the ad hoc swarm of devices implement differently based at least in part on whether the receiving device is the primary recipient or the secondary recipient and a relationship to the primary recipient.

13. The computer program product of claim 12, wherein the relationship to the primary recipient is determined based on an identifier included in the packet and an identity maintained by the receiving device.

14. The computer program product of claim 12, wherein the relationship to the primary recipient is determined based on a distance in an environment between the receiving device and the primary recipient.

15. A system, comprising:
a radio;
a processor;
a memory, including instructions that when executed by the processor, enable the system to:
receive, via the radio, a packet transmitted according to a protocol used by an ad hoc swarm of devices including the system, wherein the packet includes a command with a primary effect and a secondary effect;
identify a transmitting device for the packet;
determine a relationship between the transmitting device and the system indicating whether the transmitting device is paired with the system or is paired with a different device in the ad hoc swarm of devices;
perform one of the primary effect or the secondary effect of the command included in the packet based on the relationship, wherein the system performs the primary command included in the packet in response to determining that the transmitting device is paired with the system and performs
the secondary effect of the command included in the packet in response to determining that the transmitting device is not paired with the system.

16. The system of claim 15, wherein the instructions further enable the system to:
in response to determining that the command is not associated with a secondary effect for the system and determining that the transmitting device is not paired with the system, ignore the command.

17. The system of claim 15, further comprising a camera, and wherein the instructions further enable the system to:
transmit, via the radio, a camera feed captured by the camera to a paired Augmented Reality (AR) device.

18. The system of claim 15, wherein the secondary effect causes the system to engage a motor or an output device after a predetermined length of time from an indicated time of effect for the primary effect specified in the packet.

19. The system of claim 15, wherein the instructions further enable the system to:
in response to receiving a second packet from a second transmitting device that is paired with the system, perform a second primary effect associated with a second command included in the second packet in association with the secondary effect associated with the command.

20. The system of claim 16, wherein the instructions further enable the system to:
in response to receiving a second packet from a second transmitting device that is paired with the system, interrupt performance of the secondary effect and perform a second primary effect associated with a second command included in the second packet.

* * * * *